United States Patent
Kaemmerer et al.

(10) Patent No.: US 9,031,055 B2
(45) Date of Patent: May 12, 2015

(54) METHOD AND SYSTEM FOR RECORDING, SYNCHRONIZING AND ANALYSING DATA BY MEANS OF ANALYSIS DEVICES WHICH ARE SPATIALLY DISTRIBUTED IN A COMMUNICATION NETWORK

(75) Inventors: Ulrich Kaemmerer, Neu-Isenburg (DE); Michael Hortig, Neu-Isenburg (DE)

(73) Assignee: Schneider Electric Automation GmbH, Seligenstadt (DE)

( * ) Notice: Subject to any disclaimer, the term of this patent is extended or adjusted under 35 U.S.C. 154(b) by 68 days.

(21) Appl. No.: 13/824,426

(22) PCT Filed: Sep. 30, 2011

(86) PCT No.: PCT/EP2011/067103
§ 371 (c)(1),
(2), (4) Date: Sep. 18, 2013

(87) PCT Pub. No.: WO2012/042017
PCT Pub. Date: Apr. 5, 2012

(65) Prior Publication Data
US 2014/0003454 A1      Jan. 2, 2014

(30) Foreign Application Priority Data
Sep. 30, 2010   (DE) .......................... 10 2010 037 906

(51) Int. Cl.
*H04J 3/06*     (2006.01)
*H04L 7/00*     (2006.01)
(Continued)

(52) U.S. Cl.
CPC ............. *H04L 7/0079* (2013.01); *H04J 3/0644* (2013.01); *H04L 12/417* (2013.01); *H04L 43/106* (2013.01); *H04L 43/18* (2013.01); *H04L 67/1095* (2013.01)

(58) Field of Classification Search
CPC ... H04L 7/0079; H04L 12/417; H04L 43/106; H04L 43/18; H04L 67/1095; H04J 3/0644; H04J 2011/0096; H04J 3/065; H04J 3/0655; H04J 3/066; H04W 56/00; H04W 56/0045; H04B 7/2662
USPC .................. 370/324, 350, 503, 509, 510, 512
See application file for complete search history.

(56) References Cited

U.S. PATENT DOCUMENTS 6,967,799 B1 * 11/2005 Lee ................................. 360/51
2002/0131540 A1    9/2002 Franke et al.
(Continued)

FOREIGN PATENT DOCUMENTS

WO         03063425 A1    7/2003

OTHER PUBLICATIONS

International Search Report mailed Apr. 17, 2003, corresponding to PCT/SE03/00036.
(Continued)

*Primary Examiner* — Brend H Pham
(74) *Attorney, Agent, or Firm* — Ladas & Parry LLP

(57) ABSTRACT

A method and a system for recording, synchronizing and analyzing data transmitted between spatially distributed devices of a communication network using spatially distributed analysis devices, wherein the data are received by at least two analysis devices looped into the communication network, and wherein the received data are marked by means of a synchronization signal which is simultaneously received by the analysis devices. In order to simplify the recording, synchronization and analysis of data by means of spatially distributed analysis devices, provision is made for the analysis devices to store data frames of the received data in data files, wherein each received data frame is marked with a time stamp of a local time of the receiving analysis device, and wherein time synchronization events are produced by means of the received synchronization signal in each of the analysis devices.

12 Claims, 3 Drawing Sheets

Figure 1:
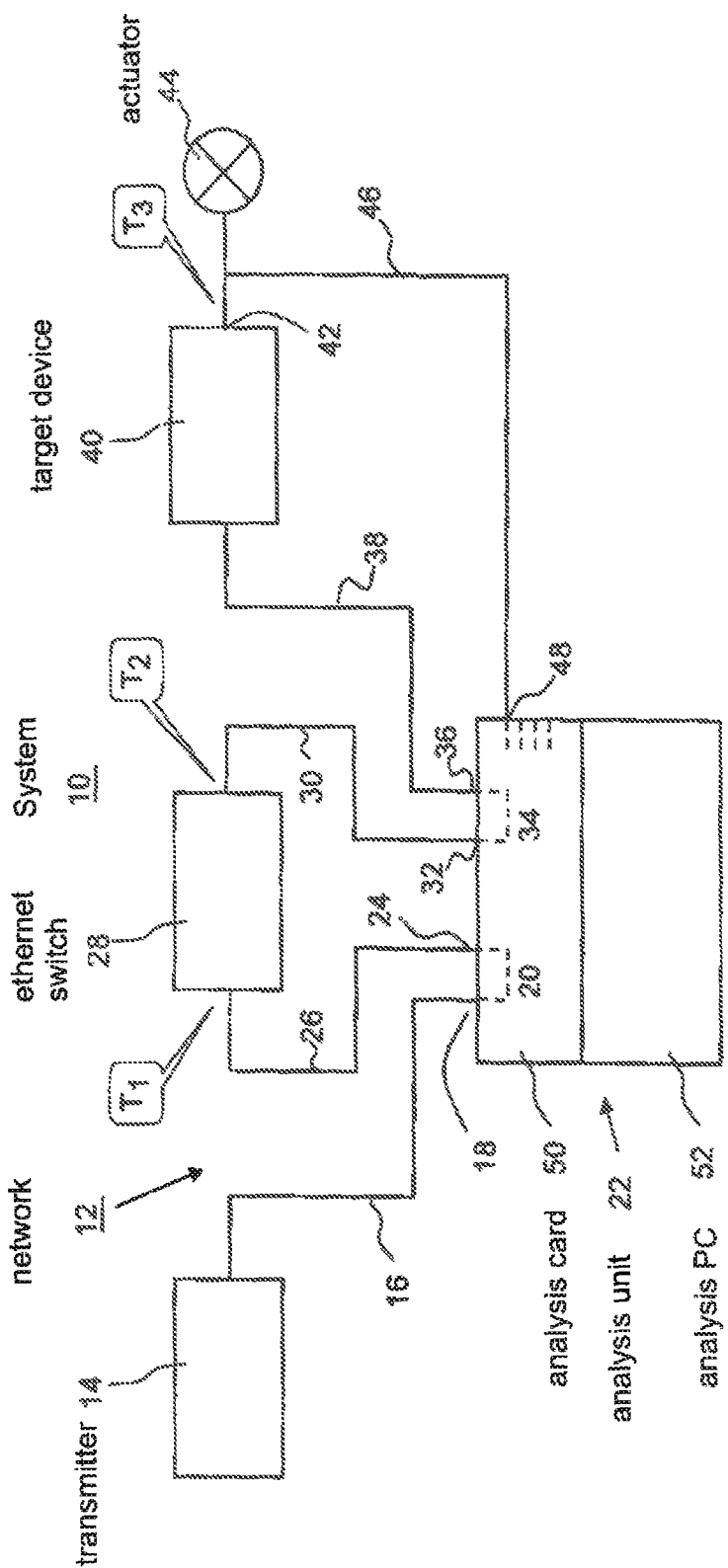

(51) Int. Cl.
  *H04L 12/417* (2006.01)
  *H04L 12/26* (2006.01)
  *H04L 29/08* (2006.01)

(56) References Cited

U.S. PATENT DOCUMENTS

| | | |
|---|---|---|
| 2004/0228367 A1 | 11/2004 | Mosig |
| 2005/0229040 A1 | 10/2005 | Franke et al. |
| 2008/0187007 A1* | 8/2008 | Goyal et al. ............... 370/503 |
| 2009/0024780 A1 | 1/2009 | Lang et al. |
| 2009/0028416 A1* | 1/2009 | Floeder et al. ............... 382/141 |
| 2009/0028417 A1* | 1/2009 | Floeder et al. ............... 382/141 |
| 2009/0222589 A1 | 9/2009 | Kirsch et al. |
| 2009/0248794 A1 | 10/2009 | Helms et al. |
| 2010/0265931 A1* | 10/2010 | Loc ............................... 370/338 |

OTHER PUBLICATIONS

Hilscher Gesellschaft. "User Manual." Hilscher Competence in Communication, 2010.

Garnica, J. J., et al. "ARGOS: A GPS Time-Synchronized Network Interface Card based on NetFPGA." Highe Performance Computing and Networking Group, Universidad Autonoma de Madrid, Spain.

* cited by examiner

METHOD AND SYSTEM FOR RECORDING, SYNCHRONIZING AND ANALYSING DATA BY MEANS OF ANALYSIS DEVICES WHICH ARE SPATIALLY DISTRIBUTED IN A COMMUNICATION NETWORK

This application is a 371 of PCT/EP2011/067103, filed on Sep. 30, 2011, which claims priority to German Application No. DE 10 2010 037 906.9, filed Sep. 30, 2010.

The invention relates to a method for recording, synchronizing and analyzing data by means of analysis units dispersed spatially within a communications network, such as a real-time Ethernet network, according to the preamble of claim 1, and to a system for implementing the method, according to the preamble of claim 5.

A method and a system for recording, synchronizing and analyzing data is described in the paper by Jaime J. Garnica, et al.: "ARGOS: A GPS-Time-Synchronized Network Interface Card based on NetFTGA"; High Performance Computing and Networking Group Universidat Autonoma de Madrid; November 2009.

The paper is also available under Garnica, Jaime, J., et al.: "ARGOS: A GPS-Time-Synchronized Network Interface Card based on NetFTGA"; High Performance Computing and Networking Group Universidat Autonoma de Madrid; NetFPGA Developers Workshop Aug. 12-13, 2010 in connection with Agende NetFPGA Developers Workshop Aug. 12-13, 2010 (http://netfpga.ord/foswiki/bin/view/NetFPGA/OneGig/DevWorkshop10).

The above paper describes a NetFTGA-based network interface card, which offers transparent GPS-time synchronization. The card enables the precise time stamping of received packets, and the transmission of groups of packets (burst of packets) at precise intervals.

The known method is characterized in that received data frames are stored in a memory. When a data frame is to be stored in the memory, it is first marked by means of a timing module with a time stamp indicating the absolute time of the received GPS signal, and is then stored.

However, the insertion of a time stamp indicating the absolute time of the received GPS signal is associated with substantial cost.

The publication "RFC: 793; TRANSMISSION CONTROL PROTOCOL, DARPA INTERNET PROGRAM PROTOCOL SPECIFICATION", September 1981, Information Sciences Institute University of Southern California describes a DoD standard transmission control protocol (TCP). The fundamental features of the TCP/IP Internet protocols are described, from which it is clear to a person skilled in the art that in a TCP transmission, the data packets are brought back to their correct temporal sequence by the receiver. For this purpose, the TCP protocol header contains a data field with a so-called "sequence number", the value of which is increased for each additional data packet.

The publication "RFC: 3550; Network Working Group H. Schulzrinne, Columbia University or RTP: A Transport Protocol for Real-Time Applications", July 2003, describes the function of restoring a sequence on the basis of a "sequence number".

DE-A-10 2008 010 536 relates to a circuit arrangement and to a method for synchronizing clocks in a network comprising a plurality of at least two nodes, wherein at least two of these nodes are able to communicate with one another, and each has a local clock.

In one of said nodes, configured as a receiving node, a global time of at least one other such node, configured as a transmitting node, issued by said transmitting node, is received.

Based upon both the received global time of the transmitting node and a local time of the designated local clock of the receiving node, a global time for said receiving node is determined or estimated.

DE-T-602 11 157 relates to a synchronous playback of media packets. This involves the transmission of media data packets, identified by time, to one or more receiving media sinks, wherein the time marking indicates the time of generation of the corresponding media data packet, the determination of a playback time offset once for all media data packets in a period, and transmission of the playback time offset to the one or more media data sinks (M) once for all media data packets in a period.

The user handbook "Net Analyzer NANL-C500-RE and NANL-500RE"0 for the Hilscher Gesellschaft für Systemautomation mbH, Doc091110UM07DE, 2007-003, www.hilscher.com" further describes analysis units and analysis cards, which function as passive components in real-time Ethernet systems for the purpose of recording and analyzing data traffic.

To analyze a data transfer on a communications path between two field units, these units must be connected to the same analysis unit.

Various modes can be used for recording the data.

In one data recording mode (Capture Data), the data are written onto the hard drive of an analysis PC. Data recording can be implemented in the "Ethernet mode" operating mode, in which standard Ethernet messages are recorded, or in the "transparent mode" operating mode, in which Ethernet messages, including the preamble and the SFD (start of frame delimiter), are recorded.

In addition, data recording can be implemented in a "timing analysis mode" (Time Analysis), in which frame data are not stored, and instead, only time stamps of individual frames are analyzed, wherein no data recording takes place.

A system 10 according to the prior art is illustrated purely schematically in FIG. 1. The system comprises a communications network 12 such as a real-time Ethernet network. A transmitter device 14 is connected via a data line 16 to a terminal 18 of a first port 20 of an analysis unit 22. A second terminal 24 of the first port 20 is connected via a data line 26 to an Ethernet switch 28, the output side of which is connected via a data line 30 to a terminal 32 of a second port 34 of the analysis unit 22. An output 36 of the second port 34 is connected via a data line 38 to a target device 40, to the output 42 of which an actuator 44 is connected. The output 42 is coupled via a signal line 46 back to a signal input 48 of the analysis unit 22. In a preferred embodiment, the analysis unit 22 comprises an analysis PC 52 having an analysis card 50.

In the case of analysis units having two recording ports, the analysis unit records the Ethernet frames and adds time stamps to them. For this purpose, the analysis unit and/or the analysis card is connected via two patch cables from one of the test connection points to an Ethernet terminal of the field units. Data recording is configured or started using software. Thus the analysis unit and the analysis software acquire the data packets of the communications path, transfer the data packets, and preferably store these per DMA (Direct Memory Access) on the hard drive. The stored files, such as binary files, are converted by means of software to the open Win Pcap, for example, which can be analyzed, for example, using Wireshark. Moreover, the analysis units or the analysis card make it possible to additionally record events at up to four digital inputs. At the digital inputs, the input signals generate a special Ethernet frame in the analysis unit or the analysis card, which is generated by the analysis card and is stored on the hard drive. The time resolution lies within the nsec range.

Analysis units of this type are used, for example, for the high-precision measurement of the latency time of multiport devices (delay between network input and a network output of a different port) or for measuring a time between an electrical input signal of a process and an Ethernet frame, which transmits information, or vice versa.

The analysis cards 50 can be received by a plurality of analysis PC's 52 dispersed throughout the network 12 being analyzed, wherein in each individual analysis PC 52, the analysis card 50 would take on the absolute time of the analysis PC 52 at the start of the program. However, the data files must also be provided with a high-resolution time stamp via the analysis card 50 and via the internal clock thereof, and transmitted to the analysis PC for analysis.

In an analysis of data traffic between spatially dispersed devices or networks, for example, a WLAN, it is not possible to detect data traffic between devices in spatially dispersed networks by means of an individual analysis unit. If data recording is implemented using individual analysis units, ordinarily PCs, the resulting multiple data files must be compiled in a global data file.

The requirements for time resolution lie within the µsec range. PCs that use standard operating systems can be synchronized only within the range of approximately 10 msec.

As described above, the individual analysis units, which provide the absolute time, can be synchronized, but not with the desired precision.

In light of the above, the present invention addresses the problem of further developing a method and a system of the type described in the introductory part, such that a recording, synchronization and analysis of data by means of spatially dispersed analysis units is simplified.

To solve the problem, i.a., a method having the features of claim 1 and a system having the features of claim 5 are proposed.

The invention is based upon the idea of ignoring the different absolute times of the analysis units and transferring the synchronization to the resulting data files. To accomplish this, all analysis units simultaneously receive a synchronization signal for triggering time synchronization events, which each of the analysis units inserts as a "pseudo frame" between data frames during the recording of the data frames of a data file.

The time synchronization event is preferably a "pseudo frame", which is inserted between the received data frames during the reception of data frames, simultaneously by the individual analysis units, i.e., independently of the local time of the analysis unit. During the analysis of the recorded data files, the "pseudo frame" can be identified, for example, by means of Wireshark, and used to synchronize the plurality of data files of the dispersed analysis units.

As the analysis unit, the invention preferably uses an analysis PC, such as a personal computer, with an insertable analysis card, which has at least one digital input, into which the synchronization signal is fed, by means of which additional events in the form of "pseudo frames" are inserted into the data file, i.e., between data frames of the data file. The time resolution lies within the nsec range.

Preferably, a radio receiver is connected to the digital signal input of each analysis card. The radio receiver receives the synchronization signal, which is transmitted either by a specific, designated radio transmitter or by a publicly available signal transmitter, for example, a time signal transmitter (DCF) or a positioning signal transmitter, such as a GPS transmitter (global positioning system).

The choice of transmitter influences the degree of precision that can be achieved. Preferably, the DCF signal is used, since this represents the simplest implementation.

When DCF is used, every second a synchronization signal is transmitted, which triggers a time synchronization event in order to insert a "pseudo frame" into the data file, i.e., between the data frames. Since the DCF signal gates out the $59^{th}$ second of each minute, it can be used for rough synchronization. As a result, the requirement of a common time synchronization in all analysis PCs involved needs only to be better than 1 minute.

From the above, it is clear that these time synchronization events are inserted synchronously or simultaneously into the various data files, and that the various data files are synchronized during the analysis thereof.

The described method permits the acquisition of Ethernet frames in a spatially dispersed network, which is dispersed further than would be permitted by a line-based measuring system. The use of a publicly available time basis allows high precision to be achieved at low cost.

The need to obtain an absolute time stamp, which is associated with high cost, is replaced by a much simpler embodiment for generating and processing simultaneous signals.

The main sources of error can be eliminated by a symmetrical implementation of all measuring points (common synchronization signal, identical receivers, identical analysis cards). The remaining error sources can be weighted in advance and therefore eliminated by calculation (e.g., signal propagation based upon different distances from the transmitter 300 m=1 µsec, pulse delays within the receiver).

Further details, advantages and features of the invention are described not only in the claims, the features specified therein—alone and/or in combination—but also in the following description of preferred embodiment examples.

Figure 2:
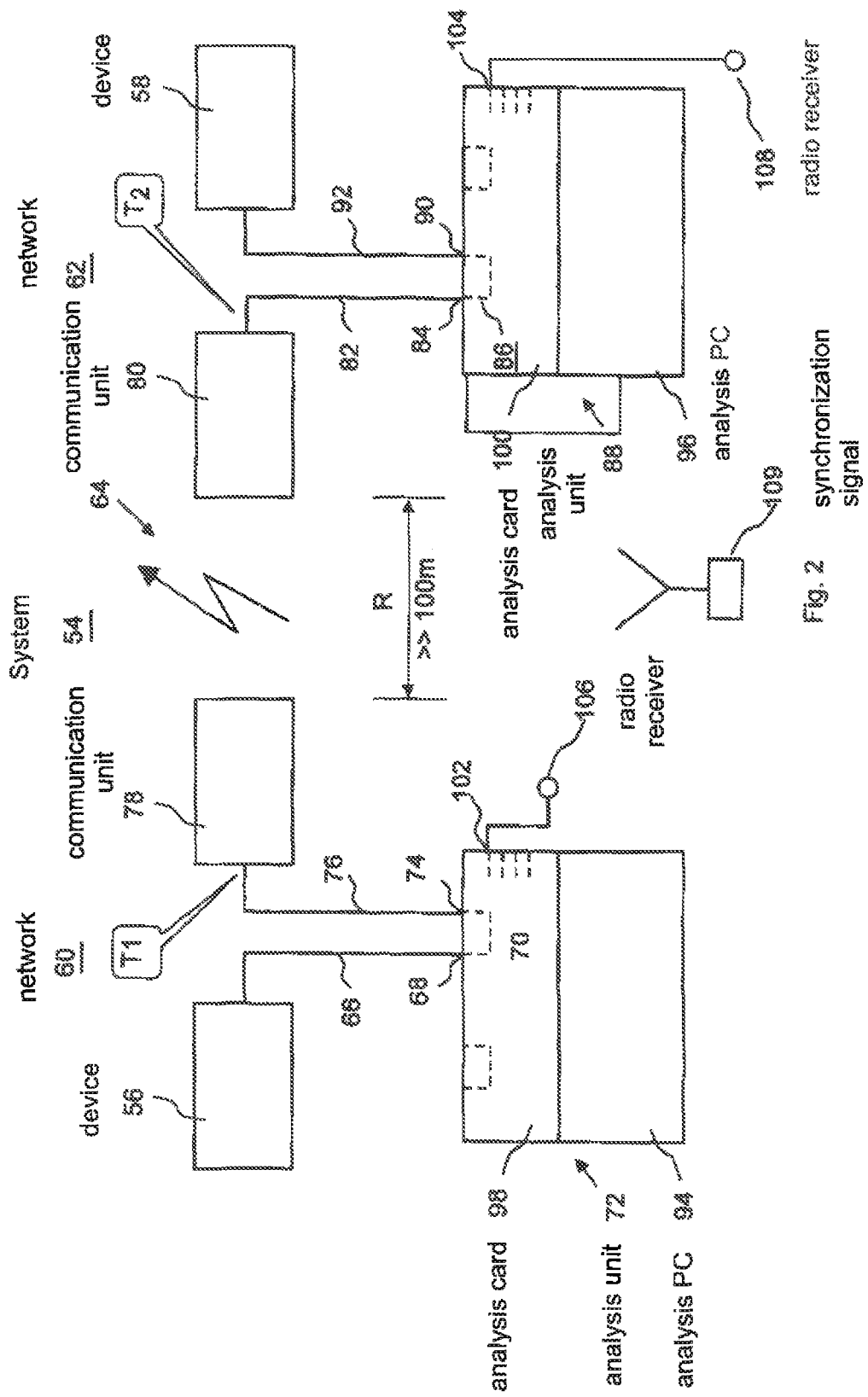
Figure 3:
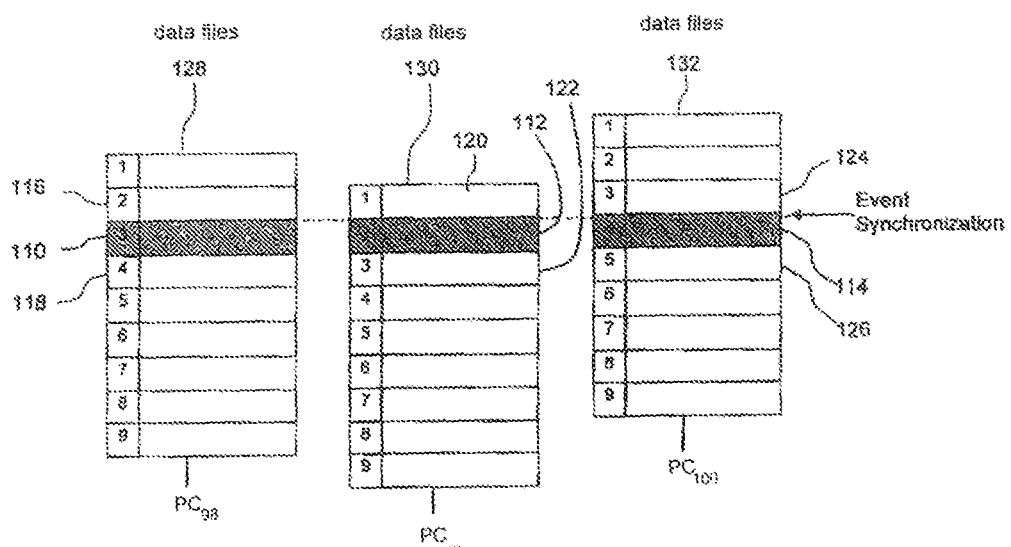

The drawings show:

FIG. 1 a system for recording and analyzing data traffic between devices of a wired communications network, FIG. 2 a system for recording and analyzing data traffic between network sections that are coupled to one another wirelessly, and FIG. 3 data files of individual analysis PCs with event synchronization.

FIG. 2 shows a system 54 for recording, synchronizing and analyzing data traffic between devices 56, 58 in spatially dispersed networks 60, 62, which are coupled to one another via a communications path 64 which influences the travel time of the data being transmitted. In the embodiment example described, the communications path 64 is embodied as a radio path. However, the communications path 64 can also be a wired communications network or a communications path which has a length within the >>100 m range, which results in travel time delays.

The network section 60 comprises the unit 56, for example, as a transmission device, which is connected via a data line 66 to an input 68 of a port 70 of an analysis unit 72. An output 74 of the port 70 is connected via a data line 76 to a wireless communications unit 78. Said unit is coupled via the wireless communications connection 64 to a wireless communications unit 80, which is connected via a data line 82 to an input 84 of a port 86 of an analysis unit 88 of the network section 62. An output 90 of the port 86 is connected via a data line 92 to the device 58 as the target device. The network sections 60, 62 are spatially dispersed, for example, at a distance R>>100 m.

The analysis unit 72, 88 preferably comprises an analysis PC 94, 96 and one analysis card 98, 100 each, which is embodied as a PC plug-in card, and is plugged into the analysis PC 94, 96. Each of the analysis cards 98, 100 further comprises a signal input 102, 104, which is connected to a radio receiver 106, 108 for detecting a publicly available synchronization signal in the form of a DCF time signal.

By means of the analysis units 72, 88, a delay time of wireless transmission between the wireless communications units 78, 80 can be determined as delay time $T_2-T_1$. For this purpose, it is necessary to synchronize the data files of the analysis PC 94, 96 or the analysis units 72, 88.

According to the invention, the different absolute times of the analysis units 72, 88 are ignored, and the synchronization is transferred to the resulting data files 128, 130, 132.

The analysis cards 98, 100 dispersed throughout the system 54 receive the synchronization signal simultaneously via their radio receivers 106, 108, and generate respective time synchronization events 110, 112, 114, each of which is inserted during data recording as a "pseudo frame" 110, 112, 114 between received data frames 116, 118; 120, 122; 124, 126 of a data file 128, 130, 132, as illustrated in FIG. 3 (event synchronization).

If the DCF signal is used as a synchronization signal, the time synchronization event is inserted each second into the data files 128, 130, 132. Since the DCF signal gates out the $59^{th}$ second of each minute, this can be used for rough synchronization. As a result, the requirement for a common time synchronization of all involved analysis units 72, 88 needs only to be better than 1 minute.

FIG. 3 shows the principle of event synchronization, wherein a time synchronization event 110, 112, 114 in the form of the "pseudo frame" is inserted synchronously into the data file. The data files are synchronized during analysis of the data.

The data files recorded by the analysis cards 98, 100 are stored on a storage medium of the analysis PC 94, 96, for example, in a PCAP format. Using software, the time stamps on the data frames within the data files, which have been generated by the respective analysis cards, are coordinated with the inserted time synchronization events. In addition, the information on the respective analysis card is encoded as additional information in each data frame. This is necessary for identifying the source of the data frame when the individual data files are compiled. This compilation is the final step in executing the program. The resulting data file then contains all the data frames of all analysis cards 98, 100, in the correct temporal sequence.

The invention claimed is:

1. A method for recording, synchronizing and analyzing data transmitted between spatially dispersed devices within a communications network including a real-time Ethernet network, by means of spatially dispersed analysis units, the method comprising the steps of:
   receiving the data by at least two analysis units looped into the communications network,
   marking the received data using a synchronization signal received simultaneously by the analysis units,
   storing data frames of the received data in data files,
   marking each of the data frames with a time stamp of a local time of the analysis units,
   generating time synchronization events simultaneously using the received synchronization data in each of the analysis units, during recording of the data files in each of the analysis units, as pseudo frames between the data frames for later synchronization,
   coordinating the local time stamp contained in the data frames in reference to the inserted time synchronization events,
   encoding specific information on the analysis units as additional information in each data frame, and
   compiling the individual data files received during measurement of the individual analysis units in reference to the simultaneous time synchronization events, so that the data frames recorded by the analysis units are in the correct temporal sequence.

2. The method according to claim 1, wherein a publicly available time signal is used as the synchronization signal.

3. The method according to claim 1, wherein the time synchronization events are inserted each second into the data files.

4. The method according to claim 1, wherein the time synchronization events are inserted synchronously and/or simultaneously into the data files.

5. The method according to claim 2, wherein the time signal is a time signal transmitter signal or a Global Positioning System signal.

6. A system for recording, synchronizing and analyzing data transmitted between spatially dispersed devices of a communications network, including a real-time Ethernet network, the system comprising:
   spatially dispersed analysis units, wherein the analysis units in the communications network connect the devices and are looped for recording the data,
   a receiver for simultaneously receiving a synchronization signal in each of the analysis units, and
   means for marking the received data on the basis of the synchronization signal,
   wherein the analysis units comprise:
   means for marking recorded data frames with a local time stamp of the receiving analysis units,
   means for storing the data frames in a data file,
   means for generating time synchronization events on the basis of the synchronization signal, and
   means for inserting the time synchronization events as pseudo frames between the data frames of a data file, and
   wherein the analysis units are configured to coordinate the local time stamp contained in the data frames in reference to the inserted time synchronization events, to encode specific information on the analysis units as additional information in each of the data frames, and to compile the data file received by the individual analysis units during measurement in reference to the simultaneous time synchronization events,
   wherein the data frames recorded by the analysis units are in a correct temporal sequence.

7. The system according to claim 6, wherein the analysis units are embodied as an analysis personal computer with a plug-in analysis card.

8. The system according to claim 6, wherein the receiver is connected to a trigger signal input of the analysis units or to the plug-in analysis card.

9. The system according to claim 6, wherein the receiver is embodied as a radio receiver, via which a locally or publicly available time signal is received.

10. The system according to claim 6, wherein the communications network is a wired or wireless communications network.

11. The system according to claim 9,
   wherein the time signal is a time signal transmitter signal or a Global Positioning System signal.

12. The system according to claim 10, wherein the wired or wireless communications network is a real-time Ethernet network.

* * * * *